Patented Oct. 3, 1922.

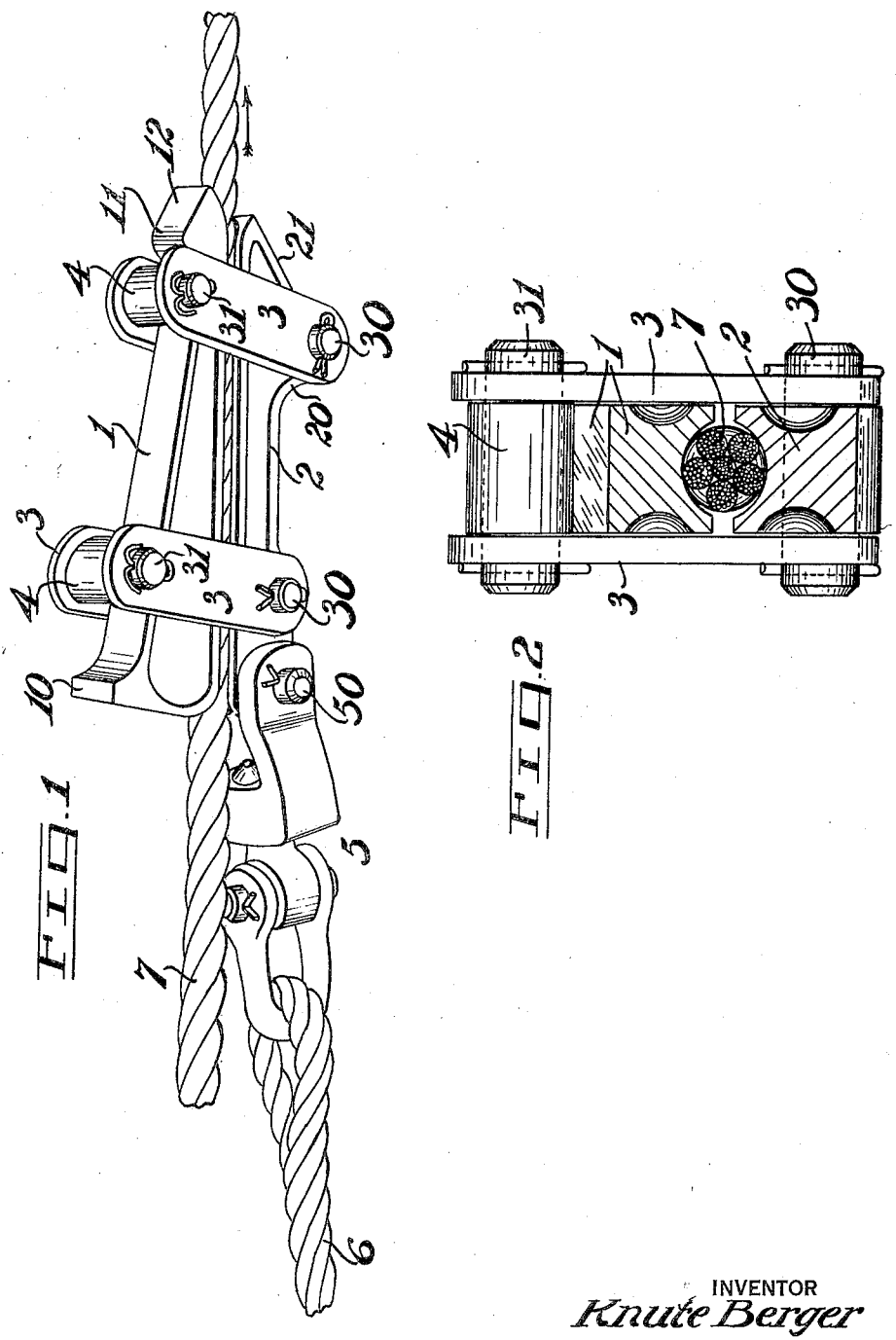

1,430,783

UNITED STATES PATENT OFFICE.

KNUTE BERGER, OF SEATTLE, WASHINGTON, ASSIGNOR TO WASHINGTON IRON WORKS, OF SEATTLE, WASHINGTON, A CORPORATION OF WASHINGTON.

CABLE CLAMP.

Application filed April 21, 1921. Serial No. 463,153.

*To all whom it may concern:*

Be it known that I, KNUTE BERGER, a subject of the King of Norway, and resident of the city of Seattle, in the county of King and State of Washington, have invented certain new and useful Improvements in Cable Clamps, of which the following is a specification.

My invention relates to clamps adapted for connection with a rope or cable for the purpose of connecting therewith another rope or cable upon which it is desired to exert a pull.

The object of my invention is to provide a device of this character which will be simple and strong in its construction, easy to apply to the cable at any point, which will hold securely, and which will not have its parts become separated in ordinary handling.

The features of my device which I believe to be new and upon which I desire to secure a patent will be herein described and then particularly pointed out in the claims.

The accompanying drawings show my device in the form of construction which I now prefer to use.

Figure 1 shows my device in perspective and applied to a section of a cable.

Figure 2 is a cross section taken at some point between the two pairs of links.

The base of my invention consists of two bars 1 and 2 which are adapted to be placed alongside of and at opposite sides of the cable and, with these, connecting links by which they are held together. One of these bars, as the bar 1, is tapered so as to form a wedge of which one side is the side which is in contact with the cable.

The two bars 1 and 2 are connected by means of links, as 3, which are pivoted to one of the bars and engage the other bar by either extending over said bar or through the means of a member by which the ends of the links are connected and which member extends over the outer face of the wedge bar.

As shown in the drawings the links are pivoted at 30 to the bar 2. The other ends of the links are connected by pins, as 31, and upon these pins are placed rollers 4 which rollers engage the outer inclined surface of the bar 1. The object of using the rollers is to eliminate a considerable part of the friction which would be produced by relative movement of the bar 1 between the links.

At one end the bar 1 is preferably provided with an upturned flange or finger, as 10, which should be of sufficient length to prevent the possibility of the wedge passing entirely through and beneath the roller which engages this end of the bar, even when the device is not applied to a cable. The other end of the same bar is provided with a projection 11 which is of such an extent that it will prevent that end of the bar from pulling through and beneath the roller 4 which engages this end of the bar. The same end of the bar is also provided with an outer inclined surface 12 outwardly from the projection 11, this being designed to act as a deflecting surface for contact with any object against which the device may contact while being drawn over the ground.

It is desirable that the links 3 at opposite ends of the device be made of the same length and construction, whereby it is possible to apply any one of these links in any position upon the device. In view of the fact that the bar 1 varies in thickness at its two ends, it is therefore necessary to have the pivot for the links which are towards the tapered end of the bar 1, farther from the cable. This is secured by providing the bar 2 with an outward projection, as 20, which removes the pivot pin 30 farther from the cable than the pivot pin at the other end of the device.

At least one of the bars 1 and 2 is provided with means for making a draft connection therewith. This I prefer to apply to the bar 2. In the form shown, this consists of a swivel which as a whole is represented by the character 5. This may be of any suitable and desired construction. Its specific construction, therefore, need not be described. It is secured to the bar 2 through the means of a pin 50 which passes through a hole in the bar. Any other type of construction may be employed.

In using this device it is applied to the cable by the removal of certain of the pins, if this be necessary, and the wedge member 1 driven up snugly. The draft connection is made to the device in such a way that a pull communicated from the main cable 7 to the cable 6, will act through the links 3 so as to draw the two bars still closer together. That is, the friction upon the bar 1 will tend to prevent its sliding along the cable. If the bar 2 slides it immediately, by reason of the angular position of the links 3, causes a tighter grip upon the cable.

In using the device the cable 7 upon which the clamp is fixed, is the one to which the power is applied. The movement of this is supposed to be in the direction indicated by the arrow at the right hand in Figure 1. By providing both the bars 1 and 2 with forward sloping surfaces, as 12 and 21, the clamp may be dragged over any ordinary object without seriously catching.

What I claim as my invention is:

1. A cable clamp comprising two bars adapted to engage opposite sides of a cable, one of said bars being tapered lengthwise on the side opposite to that which engages with the cable two pairs of links pivoted to the other bar towards its ends and embracing the tapered bar, to retain it in place the tapered bar being provided at its smaller end with an outward retaining projection which prevents removal from within the links.

2. A cable clamp comprising two bars adapted to be placed lengthwise of and to engage with opposite sides of a cable, one of said bars having the side which is next the cable and the side opposite thereto converging, links pivoted to the other bar and embracing the tapered bar and rollers journaled between the links and engaging the outer surface of the tapered bar.

3. A cable clamp comprising two bars adapted to engage opposite sides of a cable, one of said bars being tapered lengthwise on the side opposite to that which engages with the cable and links pivoted towards the ends of the other bar and embracing the tapered bar, rollers journaled between said links and engaging the outer edge of the tapered bar, said tapered bar being provided at its smaller end with an outward retaining projection which prevents removal from within the links.

4. A cable clamp comprising two bars adapted to engage opposite sides of a cable, one of said bars tapering lengthwise, a plurality of pairs of interchangeable links of uniform length, said pairs being spaced apart longitudinally of the clamp and pivoted to the non-tapering bar and embracing the cable and the tapering bar, and members fixedly connecting the links of each pair and engaging the tapering surface of the tapered bar.

Signed at Seattle, King County, Washington, this 15th day of April 1921.

KNUTE BERGER.